June 2, 1953  J. JOHNSON  2,640,227
PRODUCTION OF LENSES FROM TRANSPARENT PLASTICS
Filed Jan. 17, 1950  2 Sheets-Sheet 2

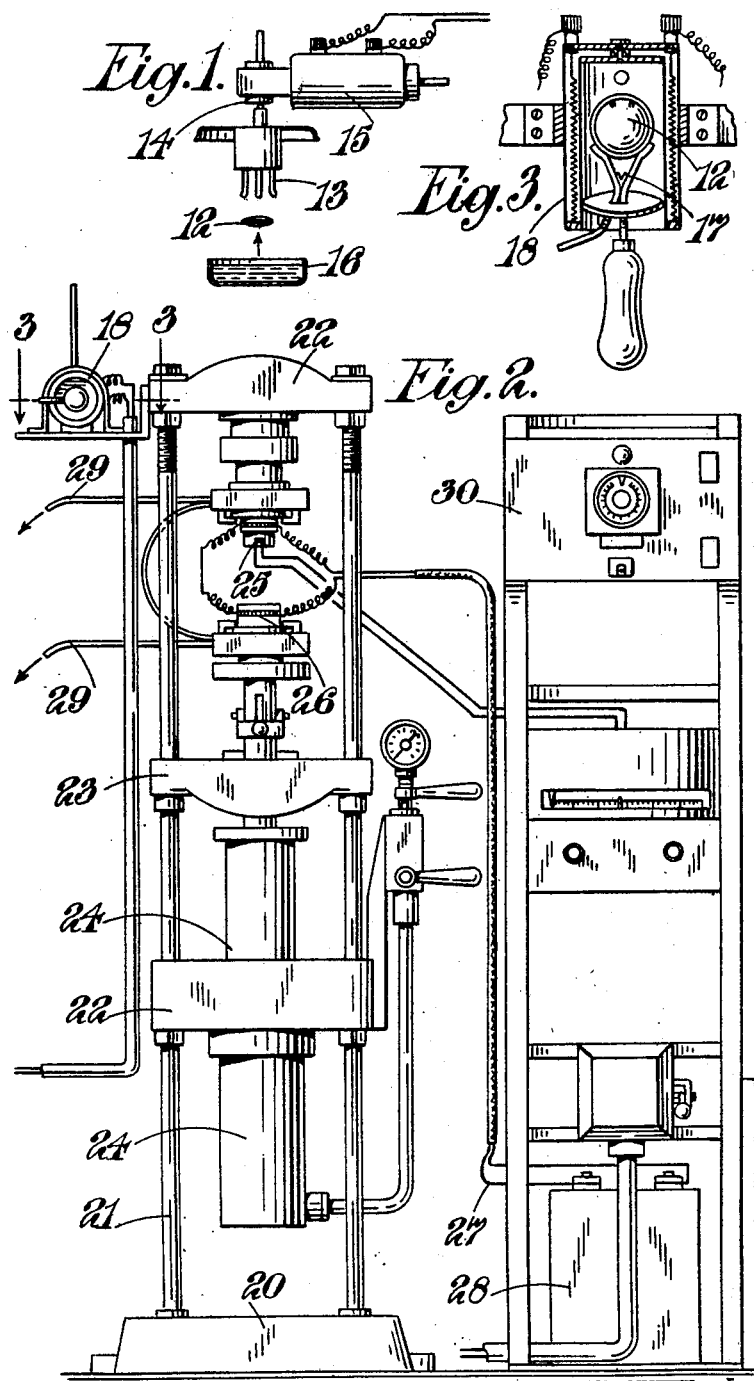

Inventor
John Johnson

Patented June 2, 1953

2,640,227

UNITED STATES PATENT OFFICE 2,640,227

PRODUCTION OF LENSES FROM TRANSPARENT PLASTICS

John Johnson, Slough, England, assignor to Combined Optical Industries Limited, Buckinghamshire, England, a British company Application January 17, 1950, Serial No. 138,971
In Great Britain April 16, 1946

9 Claims. (Cl. 18—47.5)

This application is a continuation-in-part of my application Serial No. 740,912, filed on April 11, 1947, now abandoned.

The present invention relates to improvements in the production of lenses from transparent plastics such as the alkyl methacrylate polymers or polystyrene.

The production of optically accurate lenses, e. g., spectacle lenses, by moulding transparent plastics between optically accurate surfaced dies, has been known for some years and is described in United States patent specification No. 2,432,-668 to Kingston. It has been found that the most suitable materials for the body of the lens are the transparent alkyl methacrylate polymers, e. g., methyl methacrylate polymer, since they combine lightness and resistance to shock with a clearness comparable with that of glass; all these properties are admirably suited to spectacle lenses. Unfortunately, the surfaces of these polymers are very liable to become scratched in use, a disadvantage that becomes serious when the materials are used for ophthalmic lenses.

It is thus an object of this invention to provide a method of producing an optically accurate lens having a thermoplastic base and wear-resisting surfaces.

It has already been proposed in United States patent specification No. 2,322,310 to manufacture a transparent plastic plate for use, for example, as an automobile wind-screen, by coating a plate of a transparent thermoplastic material, such as methyl methacrylate polymer, shaped to a desired form with a solution of a mixture of monomeric and partially polymerised transparent plastic abrasion-resisting material, such as allyl methacrylate. The solvent is evaporated and the coating polymerised under a slight pressure of the order of 1000 lbs./sq. in. to give the coated plate a smooth finish.

Now, in order to obtain a lens having a body of one transparent material and an external layer of a second material, which lens will not produce distorted images, it is essential that the lens shall have optically accurate surfaces and that the external layer, if it has a refractive index different from that of the body, shall have uniform thickness. Thus, for example, if a lens is moulded from methyl methacrylate polymer between optically accurate dies and then coated with a wear-resisting transparent plastic that is polymerised on to the exterior of the blank, the exterior of the coated lens will not have the desired dimensions and the lens will be useless for optical purposes. Similarly if a preform is made from transparent thermoplastic material by mechanical methods to have dimensions closely approaching those of the desired lens, the preform coated with polymerisable wear-resisting transparent plastic material and the coating polymerised in contact with the faces of dies and under the conditions described in United States patent specification No. 2,322,310, the thickness of the coating will not be uniform over the surface of the resulting lens, which will then be useless as an optical lens.

Thus, it is another object of this invention to produce an optically accurate plastic lens having a substantially uniform layer of wear-resisting transparent plastic material on its surface.

These and further objects of the invention that will become apparent later in this specification, are attained by making a lens blank of thermoplastic material, applying to the blank a thin layer of a transparent abrasion-resisting thermosetting material in the hard, nearly fully polymerised state and accurately moulding the coated blank between optically accurate dies during which last step the polymerisation of the layer is completed and the layer, the thickness of which is maintained substantially constant, is shaped to the moulded form of the blank. Thus, during the moulding step, the blank only is deformed and the layer which is too hard to be moulded but is resilient enough to have its curvature altered, smoothed or "ironed out" to conform with the new external shape of the blank. By this means, an abrasion-resisting coating having substantially constant thickness is applied to the lens blank, which in turn is moulded so as to have an optically accurate exterior, as, of course, has also the coating applied thereto.

The pressures applied during the moulding step must be, of course, sufficient to accurately mould the blank material at softening temperature. It has been found that when methyl methacrylate is employed as the base material, this pressure should be at least 2 tons/sq. in., a figure in excess of those employed in the prior suggestion for manufacturing automobile windscreens.

The invention will be more clearly understood from the following description of an example reference being made to the accompanying drawings, in which:

Figure 1 is a diagram illustrating the apparatus for applying a liquid or semi-liquid film to the transparent core;

Figure 2 is an elevation of an appropriate moulding apparatus;

Figure 3 is a plan, partly in section, of an air oven for heating the coated blank.

Figure 4:
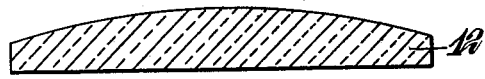
Figures 4 and 5 show blanks for a meniscus lens and a double-convex lens respectively.
Figure 5:
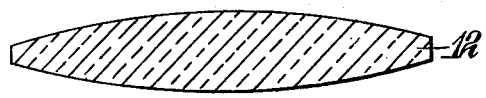

Referring to the drawings, the first step in the preparation of the plastic lenses is to produce a lens blank 12 by mechanical operations. A disc of suitable diameter is cut from a sheet of methyl methacrylate polymer and turned to the suitable shape and weight for the finished lens. The blank 12 is then buffed to give a polished surface which will disclose any dust particles. When it is desired to produce a meniscus lens, one side of the blank is left flat while the other side is turned so that the power of the blank is slightly greater (about 3% greater) than the power of the finished lens. This method of producing blanks for meniscus lenses is described in British patent specification No. 583,091. On the other hand, when it is desired to prodce a lens other than a meniscus lens, both sides of the blank are turned to approximately as near as possible with the desired finished lens. Turned blanks for a meniscus and a double-convex lens are shown in Figures 4 and 5 respectively.

The machined and buffed blank 12 is washed in carbon tetrachloride to remove grease and is then mounted horizontally in an edge-gripper 13 having conveniently three resilient prongs equally spaced. Said prongs form part of a chuck which can be driven by the vertical rotor 14 of an electric motor 15. The coating solution contained in a shallow dish 16 is raised until the blank 12 is just immersed. After about two seconds the dish 16 is removed and the motor 15 is actuated so as to spin the lens for about one minute about its optical axis. This ensures a thin film free from flow-marks and of uniform thickness about 0.0004"–0.0006" (4 to 6 tenthousandths of an inch). After spinning, the solvent has evaporated enough to leave the coated blank dry. It is now kept in a dust-free atmosphere until required for moulding. The storage period may be as short as desired but should not exceed 7 days.

The preparation of the solution is as follows: allyl methacrylate is a known chemical substance but it may be prepared in a well-known manner by condensing allyl alcohol with methacrylic acid. The monomer is heated under carefully controlled conditions in acetone using benzoyl peroxide as catalyst. The yield of useful resin is about 35 per cent reckoned on the allyl methacrylate monomer, and is precipitated from the acetone solution with aqueous methyl alcohol. The precipitated resin is well washed with methyl alcohol to remove any unchanged monomer or lower polymers. The resin is dried and redissolved in ethylene dichloride again using benzoyl peroxide as catalyst. Suitable proportions are:

Partially-polymerised allyl methacrylate _____ gm__ 7
Freshly recrystallised benzoyl peroxide _____ gm__ 2
Ethylene dichloride_____ cc__ 100

Extreme purity and freedom from moisture are essential. The solution is syrupy and colourless. This solution should be used within a period of two weeks from its preparation, and preferably within three days if the subsequent time and temperature cycles are to be kept constant. Moisture must be excluded and dry storage is required.

Before moulding, the coated blank 12 while held in tongs 17 is electrically heated in an air oven 18. This heating step is an important one in the process and the time during which the blank is left in the oven 18 and the temperature of the oven 18 is somewhat critical. The purpose of the heat treatment is:

(a) To remove the solvent, ethylene dichloride, by evaporation.

(b) To soften the methyl methacrylate polymer body of the blank in order to facilitate moulding, and (c) To polymerise the coating film to the condition in which it cannot be moulded i. e., its thickness cannot be altered during the following moulding step, but in which it has sufficient resilience to have its curvature altered during the moulding. Good results are obtained by heating the blank for five minutes at 145° C.

The moulding machine is of the hydraulic press type having a base 20, vertical columns 21 and fixed transverse members 22. A crosshead 23 can slide on the columns 21 and is controlled by a hydraulic ram 24 the cylinder of which is fixed in the frame. The upper die 25 and the lower die 26 can be heated electrically through leads 27 from a current supply such as a transformer 28. The dies 25 and 26 may also be cooled by water supplied through conduits 29. The construction and operation of the moulding apparatus are not the subject of the present invention and the apparatus is illustrated only to assist in the understanding of the process as a whole. The various operations of the moulding apparatus, i. e., the timing of the heating, closing, pressing, cooling, opening, etc., may be regulated electrically and automatically by an apparatus indicated at 30.

During the preheating of the coated blank, the highly-polished steel dies in a closed surround are electrically heated to a temperature of 135° C. At this stage the softened, coated blank is introduced between the dies and a pressure of about 2 tons per square inch is applied for between 5 minutes and 20 minutes with maintenance of the temperature at 135° C. At the end of that period the heating current is switched off but pressure is retained. When the moulded lens has cooled to 60° C. the press is opened and the hardened lens is removed from the dies. The pressure applied to the blank through the dies is sufficient to mould the methyl methacrylate polymer core with optical accuracy. At the same time, the polymerisation of the coating of allyl methacrylate is completed. The resulting lens has therefore a methyl methacrylate polymer core having optically accurate surfaces and an external coating of allyl methacrylate polymer of uniform thickness over the surface of the lens. The surfaces of the lens take up an optically accurate shape corresponding to the faces of the dies.

The press operations are preferably automatic including the timing of the heating and cooling. In the case of lenses of heavy section, the time of preheating required may be increased beyond 5 minutes, and in that case the proportion of catalyst in the coating solution is reduced. The proportion of partially-polymerised allyl methacrylate in the coating solution may also be varied within wide limits from, say 4 gms. per 100 ccs. to 14 gms. per 100 ccs. but the proportion of catalyst to partially-polymerised allyl methacrylate is maintained substantially constant at about 2 gms. benzoyl peroxide to 7 gms. partially-polymerised allyl methacrylate.

I claim:

1. A method of making from transparent plastics an optically accurate lens with wear-resisting surfaces which method comprises the steps of making a transparent fully polymerised thermoplastic blank approximating closely to the shape of the desired lens, applying to said blank a uniform thin layer of a transparent thermosetting cross-linked resin in the partially polymerised state in a solvent therefor, removing said solvent, preheating the coated blank to a temperature at which the blank is softened, thereby advancing the polymerisation of said layer to the hard almost completely polymerised state in which the layer is not longer flowable but is sufficiently pliable to be bent, accurately moulding the blank between optically accurate dies under heat and pressure and at the same time shaping the layer, the thickness of which remains substantially constant during the molding step, to shape the coated blank to conform with the optically accurate dies, and simultaneously completing the polymerisation of the layer.

2. A method of making from transparent plastics an optically accurate lens with wear-resisting surfaces which method comprises the steps of making a transparent fully polymerised thermoplastic blank approximating closely to the shape of the desired lens, aplying to said blank a uniform thin layer of a transparent thermosetting cross-link resin in the partially polymerised state, preheating the coated blank to a temperature at which the blank is softened thereby advancing the polymerisation of said layer to the hard almost completely polymerised state in which the curvature of the layer may be altered but the thickness thereof is unalterable during the subsequent moulding step, accurately moulding the blank between optically accurate dies under heat and pressure and at the same time shaping the layer, the thickness of which remains simultaneously completing the polymerisation of to conform with the optically accurate dies, and simultaneously completeing the polymerisation of the layer.

3. A method of making from transparent plastics an optically accurate lens with wear-resisting surfaces which method comprises the steps of making a transparent fully polymerised thermoplastic blank approximating to the shape of the desired lens, applying to said blank a uniform thin layer of a transparent thermosetting cross-linked resin in the partially polymerised state in a solvent therefor, removing said solvent, preheating the coated blank to a temperature at which the blank is softened, thereby advancing the polymerisation of said layer to the hard almost completely polymerised state in which the layer is no longer flowable but is sufficiently pliable to be bent, moulding the blank between opticaly accurate dies under heat and a pressure of at least 2 tons per sq. in. and at the same time shaping the layer, the thicknes of which remains substantially constant during the moulding step, to shape the coated blank to conform to the optically accurate dies, and simultaneously completing the polymerisation of the layer.

4. A method of making from transparent plastics an optically accurate lens with wear-resisting surfaces which method comprises the steps of making a blank of methyl methacrylate polymer approximating to the shape of the desired lens, applying to said blank a uniform thin layer of a partially polymerised allyl methacrylate in a solvent therefor, preheating the coated blank to a temperature at which the methyl methacrylate polymer is softened and simultaneously advancing the polymerisation of the layer to the hard almost completely polymerised state in which the layer is no longer flowable but is sufficiently pliable to be bent, accurately moulding the blank between optically accurate dies under heat and a pressure of at least 2 tons per sq. in. and at the same time shaping the layer, the thickness of which remains substantially constant during the moulding step to shape the coated blank to conform to the optically accurate dies, and simultaneously completing the polymerisation of the layer.

5. A method of making from transparent plastics an optically accurate lens with wear-resisting surfaces, which method comprises the steps of mechanically working methyl methacrylate polyymer to a form closely approximating to the shape of the desired lens, applying to said blank a uniform thin layer of partially polymerised allyl methacrylate in a solvent therefor, preheating the coated blank to a temperature at which the methyl methacrylate polymer is softened and simultaneously advancing the polymerisation of the layer to the hard almost completely polymerised state in which the layer is no longer flowable but is sufficiently pliable to be bent, moulding the blank between optically accurate dies under heat and a pressure of at least 2 tons per sq. in. and at the same time shaping the layer, the thickness of which remains substantially constant during the moulding step, to shape the coated blank to conform to the optically accurate dies, and simultaneously completing the polymerisation of the layer.

6. A method of making from transparent plastic optically accurate lenses with wear-resisting surfaces as claimed in claim 5 which includes the preparation of a suitable solution of partially-polymerised allyl methacrylate by heating monomeric allyl methacrylate in acetone using benzoyl peroxide as a catalyst, drying the product and redissolving it in ethylene dichloride with a small proportion of benzoyl peroxide to form a syrupy solution free from moisture.

7. A method of making from transparent plastic optically accurate lenses with wear-resisting surfaces as claimed in claim 5 in which the preformed blank mounted horizontally in an edge gripper is briefly immersed in a dish containing the coating solution after which the edge gripper is caused to spin the lens about its optical axis to ensure the formation of a thin uniform film and to enable the solvent to evaporate off.

8. A method of making from transparent plastic optically accurate lenses with wear-resisting surfaces which method comprises the steps of making a fully polymerised transparent thermoplastic blank approximately to the shape of the desired lens, applying to said blank a uniform coating of transparent thermosetting abrasion-resisting material in the incompletely polymerised state, preheating the coated blank to further the polymerisation of the coating to the stage where the coating is no longer flowable but is sufficiently pliable to be bent accurately moulding the blank between optically accurate dies under heat and pressure to shape the coated blank to conform to the optically accurate dies and at the same time completing the polymerising of the layer, the thickness of the layer being maintained substantially constant during the moulding step.

9. A method of making from transparent plastic an optically accurate lens with wear-resisting surfaces which method comprises the steps of making a transparent fully polymerised thermoplastic blank approximating to the shape of the desired lens, applying to said blank a substantially uniform coating of transparent thermosetting cross-linked resin in the incompletely polymerised state, preheating the coated blank to further the polymerisation of the coating to the stage where the coating is no longer flowable but is sufficiently pliable to be bent, moulding the coated blank between optically accurate dies under heat and at a pressure of at least 2 tons per square inch to shape the coated blank to conform to the optically accurate dies and at the same time completing the polymerisation of the coating layer while maintaining the thickness of the layer substantially constant during the moulding step.

JOHN JOHNSON.

References Cited in the file of this patent

UNITED STATES PATENTS

| Number | Name | Date |
|---|---|---|
| 309,914 | Abbott | Dec. 30, 1884 |
| 2,322,310 | Muskat et al. | June 22, 1943 |
| 2,339,433 | Staehle | Jan. 18, 1944 |
| 2,397,231 | Barnes | Mar. 26, 1946 |
| 2,432,668 | Kingston | Dec. 16, 1947 |
| 2,481,809 | Barnes | Sept. 13, 1949 |

FOREIGN PATENTS

| Number | Country | Date |
|---|---|---|
| 482,836 | Great Britain | Apr. 5, 1938 |